United States Patent [19]

Schulte-Elte et al.

[11] 3,978,008

[45] Aug. 31, 1976

[54] SESQUITERPENIC DERIVATIVES AS ODOR- AND TASTE-MODIFYING AGENTS

[75] Inventors: Karl-Heinrich Schulte-Elte, Onex-Geneva; Michel Joyeux, Carouge-Geneva; Günther Ohloff, Bernex-Geneva, all of Switzerland

[73] Assignee: Firmenich S.A., Geneva, Switzerland

[22] Filed: Aug. 22, 1974

[21] Appl. No.: 499,556

[30] Foreign Application Priority Data

Mar. 7, 1974 Switzerland................... 3196/74

[52] U.S. Cl................................ 252/522; 260/489; 260/497 R
[51] Int. Cl.²........................ A61K 7/46; C11B 9/00
[58] Field of Search.................. 260/489, 497 R; 252/522

[56] References Cited
UNITED STATES PATENTS

| | | |
|---|---|---|
| 3,754,036 | 8/1973 | Blumenthal........................ 252/522 |
| 3,814,704 | 6/1974 | Mookherjee........................ 252/522 |
| 3,836,584 | 9/1974 | Frater et al........................ 252/522 |
| 3,869,411 | 3/1975 | Hall et al........................... 252/522 |

*Primary Examiner*—C. Davis
*Attorney, Agent, or Firm*—Pennie & Edmonds

[57] ABSTRACT

New oxygenated sesquiterpenic derivatives useful as perfuming and odor-modifying agents in the manufacture of perfumes and perfumed articles, and as flavoring and taste-modifying agents in the aromatization of foodstuffs in general and imitation flavors for foodstuffs, animal feeds, beverages, pharmaceutical preparations and tobacco products.

Novel process for the preparation of said compounds and compositions of matter relating to mixtures containing same.

2 Claims, No Drawings

SESQUITERPENIC DERIVATIVES AS ODOR- AND TASTE-MODIFYING AGENTS

SUMMARY OF THE INVENTION

The compounds to which the present invention relates belong to the class of oxygenated derivatives of the sesquiterpene hydrocarbons of formula

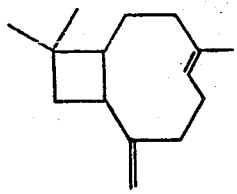

Ia (caryophyllene)

and

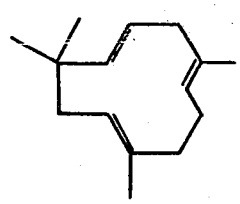

Ib (humulene)

The compounds of the invention are prepared by a process comprising the reaction between one of said sesquiterpene hydrocarbons or any mixture thereof and formic acid.

The following are specific examples of the compounds of the invention:

4,4,8-trimethyltricyclo [6.3.1.0$^{2,5}$] dodec-1-yl formate and
4,4,8-trimethyltricyclo [6.3.1.0$^{1,5}$] dodec-2-yl formate.

The compounds of the invention possess interesting organoleptic properties and, accordingly, are useful as perfuming and odour-modifying agents, and as flavouring and taste-modifying agents.

The present invention relates also to compositions or matter relating to mixtures containing same and to a process for modifying, enhancing or improving the odoriferous properties of perfumes and perfumed products, or the flavouring properties of foodstuffs, animal feeds, beverages pharmaceutical preparations or tobacco products, which process comprises adding thereto an olfactive and/or flavouring amount of at least one of the compounds prepared according to the aforementioned chemical process.

BACKGROUND OF THE INVENTION

In the art of perfumery, particularly, great attention was being devoted in the past to the utilization of caryophyllene, as well as to the preparation of certain of its derivatives. Caryophyllene, in fact, possesses a typical woody fragrance note reminiscent of that developed by cedar wood [see, e.g., A. Muller, Internationaler Riechstoff Kodex Dr A. Huthig Verlag, Heidelberg (1969)]. Its epoxide derivative of formula

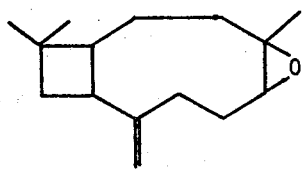

as well as its hydroxy-derivatives of formula

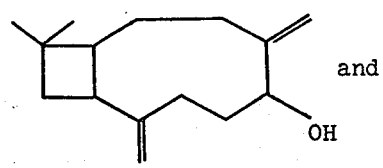

and

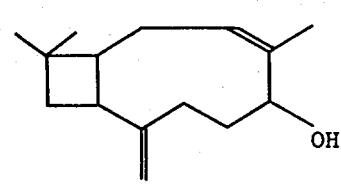

are useful ingredients for the aromatization of tobacco [see laid open to public inspection German application No. 2,202,066]. Also, caryophyllene acetate having the formula

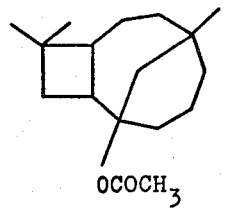

is known in the art for its green, woody-fruity character [see: S. Arctander, Perfume and Flavor Chemicals, Montclair, N.J. (1969), sect. 595].

THE INVENTION

We have now discovered that the reaction product obtained by treating a sesquiterpene hydrocarbon of formula Ia and Ib, or any mixture thereof, with formic acid develops very useful organoleptic properties and, accordingly, it is an object of the present invention to provide compositions of matter essentially consisting of, or comprising the said product.

The organoleptic properties of the said product greatly differ from that of the aforementioned prior known derivatives. The compounds of the invention possess in fact a well defined clinging woody note which enables particularly harmonious matches with a great variety of coingredients in different perfuming and flavouring compositions. Owing particularly to the absence of the unpleasant terpenic nuance shown by caryophyllene, their woody character is remarkably elegant and their use is therefore much broader in scope than that of the prior known compounds.

When the compounds of the invention are used as flavouring ingredients, they are especially appreciated for their woody and sweety gustative note. These flavouring characters are suitable for the aromatization of foodstuffs such as jams, puddings, bakery or confectionery products, and beverages such as fruit syrups.

The term "foodstuff" is used here broadly, and includes coffee, tea and chocolate.

Interesting flavouring effects can be achieved with proportions ranging from about 2 to 500 ppm, preferably from 2 to 20 ppm of the compounds of the invention, based on the weight of the product flavoured. For the aromatization of tobacco, the proportions may typically be comprised in between 50 and 500 ppm; but amounts higher than those indicated can be used for special effects. When the compounds of the invention are used in flavouring compositions, in mixtures with other flavouring agents, they may typically constitute up to 80 percent of the total weight of the flavouring composition.

When used as perfuming agents, the compounds of the invention can be used at concentrations of between about 0.5 and 1 % by weight of the total weight of the composition to which they are added. Preferentially, however, these proportions are of between about 1 and 10 percent, occasionally they have values of up to 50 or 60 percent.

When used as perfuming ingredients in perfumed articles, such as soaps, cosmetics, detergents, waxes, bleaching powders and household materials in general, their concentrations can be much smaller than those above indicated and being of about 0.01 to 0.1 % by weight, based on the weight of the perfumed article.

In accordance with the present invention, the reaction with formic acid can be effected on the sesquiterpene hydrocarbons of formula Ia and Ib either individually in their pure form or in admixtures comprising the two of them in any desired proportions relative to each other.

For practical and economical reasons, the most advantageous method of operation comprises reacting formic acid on the mixture of sesquiterpene hydrocarbons as obtained by simple distillation of the terpene fraction separated from clove oil. Due to the presence in it of appreciable amounts of eugenol, this commercially available essential oil has to be subjected to a preliminary treatment with a base, e.g. sodium hydroxide, followed by a fractional distillation. In our experience, the fraction having b.p. 80°–110°C/2 Torr represents the most suitable starting material for the process of the invention.

The individual pure compounds of formula Ia and Ib, i.e. caryophyllene and humulene, respectively, which are compounds of natural origin, can be separated from the clove oil, obtained from *Eugenia Caryophyllata* by several subsequent fractional distillations.

According to a preferred embodiment of the process of the invention, the reaction is effected at a temperature comprised between about 10° and 60°C, more particularly of between room temperature and 40°C. The reaction is exothermic and, accordingly, it is necessary to provide an external cooling as to maintain the reaction mixture in the above defined temperature limits.

The reaction time can vary within wide limits and be of from about 2 to 24 hours. However, it has been observed that a reaction time of about 5 hours is sufficient in most cases to promote a satisfactory conversion whenever the process is effected on an industrial scale.

The reaction can equally be carried out in the presence of an additional acidic agent. Suitable acidic agents include a protic mineral or strong organic acid, e.g. phosphoric acid, p-toluenesulfonic acid, an acidic diatomaceous earth, or an acid of the Lewis type, e.g. $BF_3$, $AlCl_3$, $ZnCl_2$ and $SnCl_4$. It has been observed, however, that the supplemental presence of an acidic agent does not seem to have any major influence on the course of the reaction.

An analysis of the products obtained by the process of the invention showed that they comprised two major components which were judged as being mainly responsible for the interesting odoriferous and flavouring effects they developed. A spectral analysis allowed assigning to the said components the formula

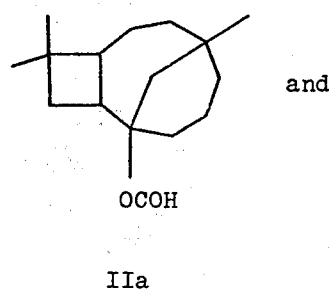

respectively.

The present invention relates also to these two novel compounds, as well as to their use as perfuming and flavouring agents. The invention is better illustrated by but not limited to the following examples wherein the temperatures are indicated in degrees centigrade. In the said examples the abbreviations have the meaning common in the art.

EXAMPLE 1

10 g of formic acid were added dropwise to a mixture of 10 g of caryophyllene, the purity of which was of about 98 %, and 0.5 g of zinc chloride under vigorous stirring and at a temperature of about 20°–25°. The reaction mixture was kept under stirring at room temperature overnight, then it was diluted with 100 ml of water and extracted with diethyl ether. The separated organic phase was washed with a 10 % aqueous solution of sodium bicarbonate, then with water until neutrality. After drying over anhydrous sodium sulphate and evaporation of the volatile portions a residue was obtained which was then bulb distilled to give 9.7 g of a product showing the desired olfactive properties. The analytical data of said product were the following:

B.p. 125°/0.01 Torr; $n_D = 1.4960$; $d_4^{20} = 1.015$; $\alpha_D + 22°$ IR: 1725, 1180 cm$^{-1}$.

An analogous operation was carried out by using as starting material the terpene fraction obtained from commercially available clove oil — b.p. 80°–110°/2 Torr. By applying an identical procedure a fraction having b.p. 90°–100°/0.01 Torr was obtained in a 61.2 percent yield.

$n_D^{20} = 1.4948$; $d_4^{20} = 1.0217$.

An analysis effected by means of vapour phase chromatography allowed to separate the major components present in the thus obtained products — CARBOWAX column 15 %; 1.5 m; 140°–220°. To the pure compounds thus separated it was attributed the following structural formulae

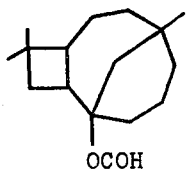

and

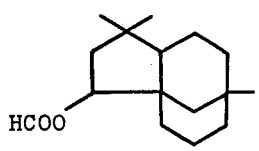

respectively.

EXAMPLE 2

A base perfume composition of the "tobacco" type was obtained by mixing together the following ingredients (parts by weight):

| | |
|---|---|
| Synthetic bergamot oil | 180 |
| Benzyl salicylate | 70 |
| Synthetic civet "Tinktur" 10 %* | 70 |
| Absolute oak moss 10 %* | 70 |
| Benjoin resinoid of Siam 50 %* | 60 |
| Coumarin | 60 |
| Ambrette musc | 50 |
| Synthetic absolute rose of may | 50 |
| Cyclopentadecanolide 10 %* | 50 |
| α-Isomethylionone | 40 |
| Amyl salicylate | 40 |
| Heliotropin | 40 |
| Geranium oil of Africa | 30 |
| Lavender oil | 30 |
| Isobutyl benzoate | 30 |
| Eugenol | 20 |
| Linalyl acetate | 20 |
| Synthetic absolute orange flowers | 20 |
| Lemon oil | 10 |
| Patchouli oil | 10 |
| Isoeugenol | 10 |
| α-Ionone | 10 |

-continued

| | |
|---|---|
| Nonanal 10 %* | 10 |
| Decanal 10 %* | 10 |
| 1,6,10,10-Tetramethyl-2-oxa-tricyclo [8.3.0.0$^{6,11}$]tridecane 0.1 %* | 10 |
| Total | 1000 |

*in diethyl phthalate

A novel composition was obtained by adding 10 g of one of the products obtained by the process as described in Example 1 above to 90 g of the above indicated perfume base composition. Said novel composition possessed a more distinct, elegant and clinging woody note than that of the base composition. It possessed moreover a better fragrance harmony.

EXAMPLE 3

100 g of "American blend" tobacco were sprayed with 7 g of a 1 % solution of one of the products obtained according to the process described in Example 1 above in 95 % ethanol. The tobacco thus flavoured was used to manufacture test cigarettes. As a control, cigarettes were also manufactured from the same tobacco sprayed with 95 % ethanol alone. The smoke from the cigarettes was subjected to organoleptic evaluation by a panel of flavour experts, who unanimously stated that the smoke of the flavoured cigarettes possessed a sweeter character than that of the control cigarettes and presented moreover a woody note reminiscent of that developed by cedar wood.

EXAMPLE 4

A base perfume composition of woody type was prepared by mixing together the following ingredients (parts by weight):

| | |
|---|---|
| Product prepared according to Ex. 1 | 500 |
| p-ter-Butylcyclohexyl acetate | 200 |
| Synthetic bergamot oil | 120 |
| Galbanum resinoid | 80 |
| α-Isomethylionone 100 % | 60 |
| Muscone 10 %* | 30 |
| 1,1-Dimethyl-4-acetyl-6-ter-butylindane 10 %* | 10 |
| Total | 1000 |

*in diethyl phthalate

The above composition possessed a very strong woody character.

EXAMPLE 5

A base perfume composition for men was prepared by adding the following ingredients:

| | |
|---|---|
| Galbanum oil 10 %* | 120 |
| Bergamot oil | 100 |
| p-ter-Butylcyclohexyl acetate | 100 |
| Methyl-octyl-acetaldehyde 10 %* | 80 |
| Synthetic jasmin oil | 60 |
| Lemon oil | 60 |
| Absolute colourless oakmoss 50 %* | 60 |
| Lavender absolute | 40 |
| Clove oil | 40 |
| Dimethyl-cyclohexene-carbaldehyde 10 %* | 40 |
| α-Isomethylionone | 40 |
| Synthetic orange oil | 30 |
| α-Methyl-benzyl-carbinyle-acetate | 30 |
| Dodecanal 1 %* | 30 |
| Patchouli oil | 20 |
| Neroli oil Bigarade 10 %* | 20 |
| Oriental sandal oil | 10 |
| 1,1-Dimethyl-4-acetyl-6-ter-butylindane 10 %* | 10 |
| Muscone 10 %* | 10 |
| Total | 900 |

*in diethyl-phthalate

By adding to the 90 g of the above base composition 10 g of the product as directly obtained by the process described in Ex. 1, there was obtained a new perfume composition which possessed an improved elegant woody note when compared with the base composition.

What is claimed is:

1. A perfuming composition which comprises as one of its active ingredients a product selected from the group consisting of 4,4,8-trimethyltricyclo [6.3.1.0$^{2,5}$] dodec-1-yl formate and 4,4,8-trimethyltricyclo [6.3.1.0$^{1,5}$] dodec-2-yl formate.

2. A process for modifying, enhancing or improving the odoriferous properties of perfumes and perfumed articles, which comprises adding thereto an olfactive amount of at least one of the products selected from the group consisting of 4,4,8-trimethyltricyclo [6.3.1.0$^{2,5}$] dodec-1-yl formate and 4,4,8-trimethyltricyclo [6.3.1.0$^{1,5}$] dodec-2-yl formate.

* * * * *

UNITED STATES PATENT AND TRADEMARK OFFICE
CERTIFICATE OF CORRECTION

PATENT NO. : 3,978,008
DATED : August 31, 1976
INVENTOR(S) : Karl-Heinrich Schulte-Elte et al.

It is certified that error appears in the above-identified patent and that said Letters Patent are hereby corrected as shown below:

Column 4, line 34, after formula IIa insert

--(4,4,8-trimethyltricyclo $[6.3.1.0^{2,5}]$dodec-1-yl formate)--.

Column 4, line 53, after formula IIB insert

--(4,4,8-trimethyltricyclo $[6.3.1.0^{1,5}]$dodec-2-yl formate)--.

Signed and Sealed this

Sixteenth Day of November 1976

[SEAL]

Attest:

RUTH C. MASON
Attesting Officer

C. MARSHALL DANN
Commissioner of Patents and Trademarks